May 15, 1962 R. E. WALKER 3,034,624
ACTUATING DEVICE FOR SPRING CLUTCH MECHANISM
Filed July 13, 1959 2 Sheets-Sheet 2
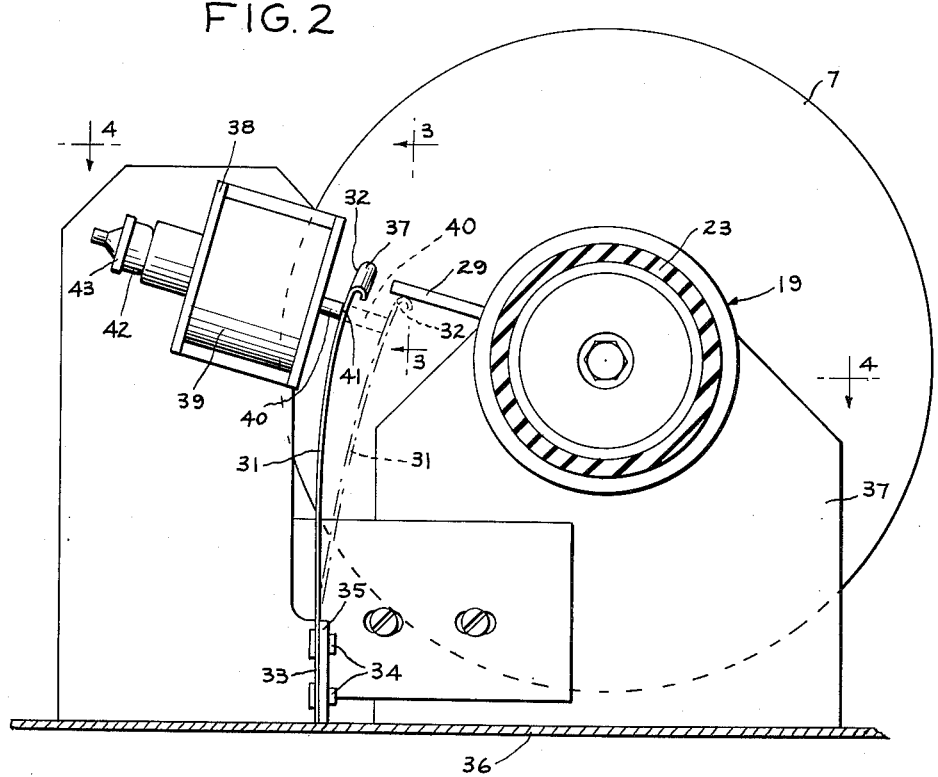
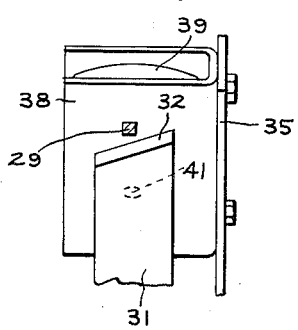
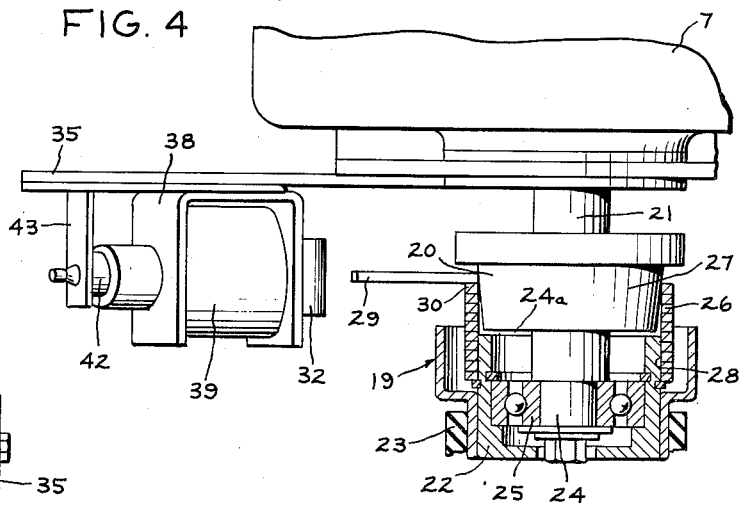
INVENTOR
ROGER E. WALKER
BY Derek P. Lawrence
HIS ATTORNEY United States Patent Office
3,034,624
Patented May 15, 1962

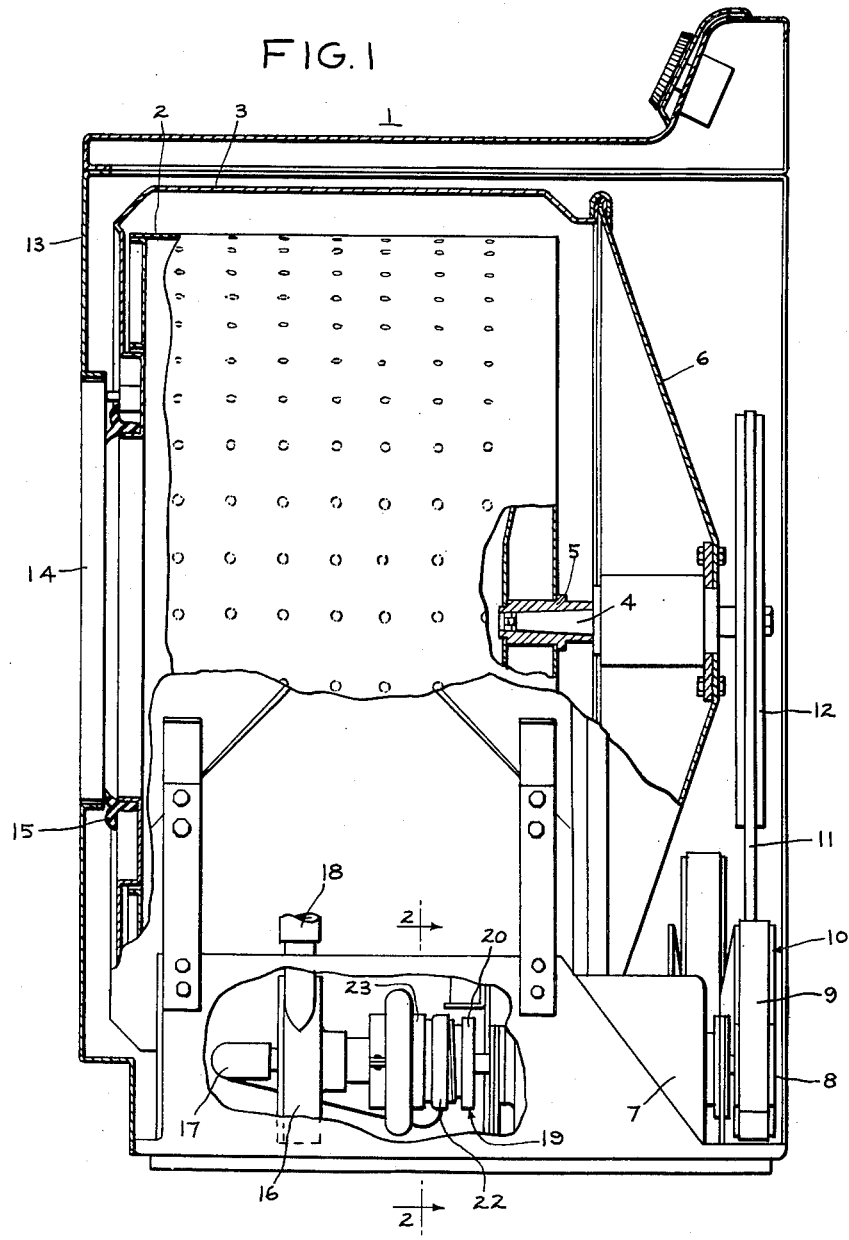

3,034,624
ACTUATING DEVICE FOR SPRING
CLUTCH MECHANISM
Roger E. Walker, Louisville, Ky., assignor to General
Electric Company, a corporation of New York
Filed July 13, 1959, Ser. No. 826,746
7 Claims. (Cl. 192—81)

This invention relates to spring clutch mechanisms, and more particularly to an improved actuating device for selectively operating such a spring clutch mechanism.

The clutching action in spring clutch mechanisms is provided by means of a helically wound spring which is disposed around coaxial driving and driven members. Conventionally, the clutch spring is so wound that it is normally tightened onto both members by the rotation of the driving member and thereby couples them securely together. In order to disengage the clutch, that is, in order to prevent the clutch spring from coupling together the two members, a tab is provided on the end of the spring which is associated with the driving member, and a movable control member is arranged to engage this tab so as to hold it stationary. When the tab is engaged by the control member, the spring is prevented from tightening onto the members as a result of the rotation of the driving member, and thereby the driven member is not coupled to the driving member.

In the past, the conventional means of operating the control member has been through the use of a solenoid having a spring biased armature member arranged in controlling relation to the control member. When the solenoid coil is energized the armature member causes movement of the control member either into or out of a tab-engaging position, and when the solenoid coil is de-energized the spring associated with the armature member moves the armature member to cause the control member to move to the other position. In the conventional construction, the spring for causing movement of the armature member when the solenoid coil is de-energized, and the control member movable into and out of engagement with the spring tab are separate in identity and function.

It is an object of this invention to provide a structure wherein a single member fills both the function of the solenoid spring member and the function of the tab-engaging control member, so that the structure is simplified and the cost of the controlling structure is decreased by virtue of the elimination of one member while retaining its function.

More specifically, it is an object of this invention to provide, in combination with a spring clutch mechanism, a control arrangement wherein a single leaf spring member functions both as the armature spring to move the armature to a predetermined position when the solenoid coil is de-energized, and as the tab-engaging member to engage the tab when the solenoid coil is energized.

A further specific object of the invention is to achieve the desired result by providing a leaf spring which, in response to the movement of the armature when the coil is energized, is deformed into the path of the spring tab, and which when the coil is de-energized moves back by virtue of its own resilience to a position out of the path of the spring tab, at the same time moving the armature member back to its inactive position.

In carrying out my invention, I provide a spring clutch member having an external clutching surface, a rotatable driven member coaxial with the driving member and having an external clutching surface, and a helical clutch spring disposed around the clutching surfaces so as to tighten thereon and clutch the members together when the driving member rotates. The helical clutch spring is provided with an outstanding tab formed on that end which is associated with the driving member.

In order to control the clutching action, I provide a leaf spring which has one end free and is rigidly secured at a point substantially removed from the free end. A solenoid coil controls the longitudinal movement of an armature member, one end of which is in engagement with the leaf spring at a point between the rigidly secured portion and the free end of the leaf spring. The leaf spring is biased to a position in which it retains the armature member in an unactuated position by its engagement therewith. However, when the solenoid coil is energized, the armature member overcomes the resiliency of the leaf spring and forces it to deflect from its first position to a second position. In the first position of the leaf spring it is entirely outside the path of rotation of the tab; however, in its second position the free end of the leaf spring is moved into the path of rotation of the tab to prevent tightening of he helical spring on the driven and driving members. In this manner, the leaf spring performs both the function of an armature spring to retain the armature in a proper position when the solenoid coil is de-energized, and the function of a control member to stop the clutching action when the coil is energized.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

In the drawings,

FIGURE 1 is a side elevational view of a clothes washing machine including an improved spring clutch and control arrangement embodying my invention, the side panel of the machine being removed and the view being partially broken away and sectionalized to show details;

FIGURE 2 is a view along line 2—2 in FIGURE 1;

FIGURE 3 is a view along line 3—3 in FIGURE 2;

FIGURE 4 is a view along line 4—4 in FIGURE 2.

Referring now to FIGURE 1 of the drawings, I have shown therein a horizontal axis washing machine 1 which includes a clothes basket or drum 2 disposed within an outer imperforate tub 3. Basket 2 is both supported and rotated by means of a shaft 4 journalled within an elongated bearing 5 hung from the rear wall 6 of the tub structure. Shaft 4, and thus the basket, are driven from a drive motor 7 by means of a suitable drive system including a pulley 8, directly secured to the motor, which through a belt 9 drives a conventional adjustable speed pulley arrangement 10. From adjustable speed arrangement 10 the drive is transmitted through a belt 11 to a pulley 12 secured to the end of shaft 4 in driving relation therewith. The adjustable speed portion 10 of the transmission is so arranged that the basket may be driven at a low speed for washing clothes and at a high speed for centrifugally extracting water from the clothes.

The outer imperforate tub 3 is itself surrounded by an appearance cabinet 13, and suitable openings are provided within the front walls of the appearance cabinet, the tub, and the basket to provide for the loading of clothes into and unloading of clothes from the machine. As shown, a door 14 is mounted on the appearance cabinet for closing the opening in that structure during the operation of the machine. In addition to closing the cabinet opening, the door 14 also closes against a gasket 15 so that it seals off the tub during the machine operation.

In order to drain tub 3 at the close of the washing operation, and also throughout the centrifugal extraction operation, machine 1 is provided with a centirfugal drain pump 16. This pump, when in operation, withdraws water from the tub through a conduit 17 and discharges it to a household drain through its outlet 18. The pump is driven from the main drive motor 7 through a spring clutch mechanism 19. The input or drive member 20 of clutch 19 is connected to the drive shaft 21 of the motor, and the output or driven member 22 of the clutch is arranged coaxially with driving member 20 and is connected in driving relation to pump 16 through a flexible connection 23.

More specifically, referring now to FIGURES 2, 3 and 4, member 20 includes an extension 24 (FIGURE 4) on which is mounted a bearing member 25 rotatably supporting the driven member 22. The driven member 22 is spaced slightly from the driving member 20 by a space 24a so that there is no interference between the members when relative rotation is desired.

In order to provide a drive between the driving member 20 and the driven member 22, there is provided a helically wound clutch spring 26 which is disposed around surfaces 27 and 28 of members 20 and 22 respectively. Both these surfaces are preferably generally cylindrical in shape; as a specific example, as shown and as more fully described and claimed in Patent 2,878,914, issued on March 24, 1959, to J. C. Worst and assigned to General Electric Company, assignee of the present invention, the driving member surface 27 may be slightly tapered, tending toward a frusto-conical shape.

Normally, motor shaft 21 and driving member 20 rotate continuously during the operation of machine 1. In order to provide for disengaging the spring clutch 19 during washing operations so as to inactivate the drain pump 16, a radically outwardly projecting tub 29 is provided at the end 30 of clutch spring 26, i.e., the end associated with driving member 20. When tab 29 is prevented from movement, it results in about the first half turn of the spring 26 rising slightly off the clutching surface 27 of driving member 20; as a result, the spring does not wind down onto the surfaces 27 and 28, but instead remains in the position illustrated in FIGURE 4 wherein it does not couple the surfaces together. In other words, when tab 29 is prevented from movement, the spring does not cause rotation of driven member 22. However, when the movement of tab 29 is unimpeded, then the clutch spring couples the driving and driven members tightly together by tightening down on both surfaces 27 and 28.

In order to control the operation of the spring clutch mechanism 19, I provide a leaf spring member 31 which has one freely movable end 32 which is rigidly secured at a point substantially removed from its free end, as for instance at its other end 33. The securement may be by any appropriate means such as rivets 34 securing end 33 of the leaf spring to a bracket member 35 in turn rigidly secured to the base 36 of machine 1 and to motor supporting member 37. The free end 32 of spring 31 is curved over, as shown at 37, and also, as shown in FIGURE 3, is formed at a bias relative to the longitudinal axis of the leaf spring. Bracket 35 also supports a U-shaped member 38 in which is mounted a solenoid coil 39. Energization of coil 39 causes movement along its own longitudinal axis of an armature member 40 which at one end 41 thereof rests against the surface of leaf spring 31. Preferably, the longitudinal axes of the armature member and the leaf spring are at a substantial angle to each other at the point of intersection. The normal resiliency of leaf spring 31 causes armature member 40 to be pushed back to the position shown in FIGURE 2 when coil 39 is not energized. The limit of movement of armature member 40 by spring 31 is determined by a combination housing and stop arrangement 42 secured between U-shaped member 38 and an extension 43 of bracket 35.

When coil 39 is energized by an appropriate electric control circuit (not shown) in machine 1, it pulls armature member 40 to the position shown in phantom outline in FIGURE 2 against the resilient action of leaf spring 31. The engagement of the armature member 40 and of the leaf spring 31 causes the movement of the armature member to force the leaf spring to the position shown in phantom outline. It will readily be seen that in this second position the leaf spring is directly in the path of rotation of tab 29 so that, as the tab comes around during the rotation of shaft 21, it engages end 32 of the leaf spring as shown in FIGURE 2. Preferably, this engagement occurs with the longitudinal axis of the leaf spring substantially in the plane of rotation of the tab, at a right angle to the tab in the position of engagement.

Engagement of the leaf spring and the tab prevents further rotational movement of the tab, thereby unwinding spring 26 slightly as previously described and releasing driven member 22. Because the end 32 of the leaf spring is curved over, as shown at 37, a smooth surface rather than an edge is provided to take the impact of engagement of the tab and of the leaf spring. This shape of the end of the leaf spring, and the engagement of the armature member with the leaf spring between the free and secured ends, tends to keep the leaf spring resiliently rigid; thus, it has the strength to bear the impact which occurs and yet the resiliency to permit enough additional motion after impact so that the forces of impact are not excessive. The bias shape of the end 32 of leaf spring 31 has been found to provide the advantage that, by causing side pressure to be applied to the tab (best seen in FIGURE 3), it tends to force the coils of the helical spring 26 together and prevent vibrational noise from the coil spring. Yet a further advantage is that by causing the angle between the longitudinal axes of the armature member 41 and the leaf spring member 31 to be substantially 90 degrees when the leaf spring is in its tab-engaging position, side thrust forces on the armature member are substantially eliminated. It has been found that the existence of such forces increases the possibility of an undesirable hum which may occur during the energization of the solenoid coil; thus, the provision of purely longitudinal forces is effective in substantially eliminating any such hum.

It will readily be seen that in the position of armature 40 when coil 39 is energized, as described, rotation of driven member 22 is prevented and the pump 16 does not operate. When coil 39 is deenergized, there is no longer any magnetic force maintaining the armature member 40 in its phantom position, except possibly a small amount of residual magnetism, and the resiliency of spring 31 is then effective to cause the spring to return to its first position thereby returning armature member 40 to its unactuated position. Of course, it is clear that the design of the apparatus may readily be made so that spring 31 is effective to break any hold resulting from the residual magnetism; however, in those solenoid structures which normally are provided both with an armature spring and with a small additional spring for breaking the hold of residual magnetism, it is clear that the small additional spring (not shown), may be retained or eliminated as desired, and that if retained it will be of assistance to spring 31 in breaking the hold of residual magnetism. The function of moving armature member 40 back to its unactuated position is, of course, performed by spring 31.

It will be seen from the foregoing description that spring 31 provides the desired effect of controlling tab 29 to control the engagement or disengagement of driven member 22, and also acts as a return spring for armature member 40. In addition it will be seen that, as opposed to previous designs where a relatively rigid member was used to control tab 29, the inherent resilience of leaf spring 31 will cause the impact to be softened when tab 29 strikes the end 32 of the leaf spring, and that the formation of the end of the leaf spring increases this advantage by preventing any vibrational noise from the coil spring 26 when member 22 is unclutched.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such equivalent variations as fall within the true spirit and scope of my invention.

What I claim as new and desire to secure by Letters Patent of the United States is:

1. A rotatable driving member having an external clutching surface; a rotatable driven member coaxial with said driving member and having an external clutching surface; a helical clutch spring disposed around said clutching surfaces so as to tighten thereupon and clutch together said members upon rotation of said driving member; and means for selectively preventing said helical spring from tightening onto said surfaces during rotation of said driving member thereby to maintain said members disengaged, said means comprising an outstanding tab formed on the end of said helical spring associated with said driving member, an elongated leaf spring having a free end, means rigidly securing said leaf spring at a point substantially removed from said free end, a solenoid coil, and an armature member movable from a first position to a second position upon energization of said coil, one end of said armature member being in engagement with said leaf spring at a point intermediate said rigidly securing means and said free end, said leaf spring in a first position thereof retaining said armature member in its first unactuated position by its engagement therewith, said armature member forcing said leaf spring to deflect from its said first position to a second postion when said armature member moves to its second position during energization of said coil, said leaf spring in said first position being entirely outside the path of rotation of said tab, said leaf spring in said second position having its longitudinal axis extending into the path of rotation of said tab so that said tab contacts said free end and said axis extends substantially perpendicular to said tab at the point of contact.

2. The apparatus defined in claim 1 wherein said armature member is movable along a path which intersects the longitudinal axis of said leaf spring substantially perpendicularly when said leaf spring is in said second position.

3. The apparatus defined in claim 1 wherein said means rigidly securing said leaf spring is secured to said leaf spring at the other end of said leaf spring from said free end.

4. The apparatus defined in claim 1 wherein said armature is positioned so that it extends downwardly into engagement with said leaf spring.

5. The apparatus defined in claim 1 wherein said free end of said leaf spring is curved over to present a smooth surface to said tab.

6. The apparatus defined in claim 1 wherein said free end of said leaf spring is formed on a bias relative to the longitudinal axis of said leaf spring thereby to apply side pressure to said tab upon engagement therewith.

7. The apparatus defined in claim 1 wherein said tab extends radially outward from the remainder of said helical spring.

References Cited in the file of this patent

UNITED STATES PATENTS

| | | |
|---|---|---|
| 1,659,724 | Creed | Feb. 21, 1928 |
| 1,960,004 | Franz | May 22, 1934 |
| 2,434,480 | Anderson | Jan. 13, 1948 |
| 2,521,159 | Geldhof et al. | Sept. 5, 1950 |
| 2,734,606 | Bellamy | Feb. 14, 1956 |
| 2,878,914 | Worst | Mar. 24, 1959 |

FOREIGN PATENTS

| | | |
|---|---|---|
| 737,669 | Great Britain | Sept. 28, 1955 |